United States Patent [19]

Tanaka

[11] Patent Number: 4,529,081
[45] Date of Patent: Jul. 16, 1985

[54] CASE FEEDER

[75] Inventor: Nobuhiro Tanaka, Saitama, Japan

[73] Assignee: Kao Corporation, Tokyo, Japan

[21] Appl. No.: 511,962

[22] Filed: Jul. 8, 1983

[30] Foreign Application Priority Data

Jul. 9, 1982 [JP] Japan ............................. 57-119644

[51] Int. Cl.³ .............................................. B65G 1/04
[52] U.S. Cl. .................................... 198/429; 198/367;
198/436; 414/278; 414/285
[58] Field of Search ............... 414/277, 278, 280, 281,
414/285, 398; 198/371, 372, 367, 370, 424, 436,
429

[56] References Cited

U.S. PATENT DOCUMENTS 3,921,828 11/1975 Suizu .................................. 414/280
4,039,072 8/1977 Keller et al. ....................... 198/429

Primary Examiner—Robert G. Sheridan
Attorney, Agent, or Firm—Cushman, Darby & Cushman

[57] ABSTRACT

A case feeder conveyor system is provided with an accumulation conveyor and a central conveyor which is located on an elevator, the accumulation conveyor, at a transfer station, is provided with a pusher bar that extends the length of the accumulation conveyor whereby a predetermined number of cases on this conveyor can be transferred to the central conveyor at one time.

10 Claims, 6 Drawing Figures

CASE FEEDER

BACKGROUND OF THE INVENTION

The present invention relates to a case feeder which supplies a predetermined number of case members transported by a conveyor to predetermined positions. More particularly, this invention relates to a case feeder which supplies a predetermined number of case members to a case flow rack comprising multiple layers and multiple rows.

DESCRIPTION OF THE PRIOR ART

A conventional case feeder of this type has supplied case members transported from a carrier conveyor to a case flow rack by aligning and stocking a predetermined number of case members on an accumulation conveyor, transferring the stocked case members to a feed conveyor one case at a time so that a predetermined number of case members are disposed on the feed conveyor, and then moving the feed conveyor in vertical directions by means of a crane and in horizontal directions on a horizontal rail. This mechanism was detrimental in that the feed conveyor has to be on standby when case members were being aligned, and while the feed conveyor was supplying case members to the case flow rack, the accumulation conveyor could not receive the following case member from the carrier conveyor, thus wasting time in supplying case members.

Since a conventional feed conveyor could transport cases only in one direction, if the direction of transport of the feed conveyor and the movement of the feed conveyor on the rail were the same, it was necessary to extend the rail length so that it would be longer than the width of the case flow rack, thereby wasting space. In case the transport direction of the feed conveyor and the moving direction of the feed conveyor on the rail were perpendicular to each other, the passage of the feed conveyor has to be kept wide.

The present invention aims at obviating the above mentioned defects and disadvantages and at providing a case feeder (a) which can swiftly supply a predetermined number of case members to predetermined positions, and (b) which can effectively utilize a space when the supply conveyor moves.

SUMMARY OF THE INVENTION

The case feeder of this invention includes an accumulation conveyor of the type which is installed at the end of a carrier conveyor and which stocks a predetermined number of case members transported from this conveyor and a feed conveyor which is mounted adjacent to said accumulation conveyor and which supplies the case members stocked on the accumulation conveyor to predetermined positions respectively. The present invention is characterized in that it is provided with a transfer means to transfer a predetermined number of case members stocked on said accumulation conveyor collectively onto said supply conveyor, said supply conveyor being parallel to said accumulation conveyor in the longitudinal direction thereof and provided with a center conveyor at the center thereof which is transportable in both longitudinal directions, and with case feed members at both ends thereof adjacent to both ends of said center conveyor for transporting case members to predetermined storage positions.

It is preferable that the transport direction of said accumulation conveyor and that of said center conveyor be parallel to each other, and that the transfer direction of said transfer means be perpendicular to said transport direction.

The transport direction of said case supply member is also preferably perpendicular to the transport direction of said center conveyor.

Said transfer means is preferably a pusher.

Furthermore, it is also preferable to construct said feeding conveyor so as to be movable in the longitudinal direction thereof.

DETAILED DESCRIPTION OF THE INVENTION

The present invention will now be explained referring to preferred embodiments which are shown in the attached drawings.

Figure 1:
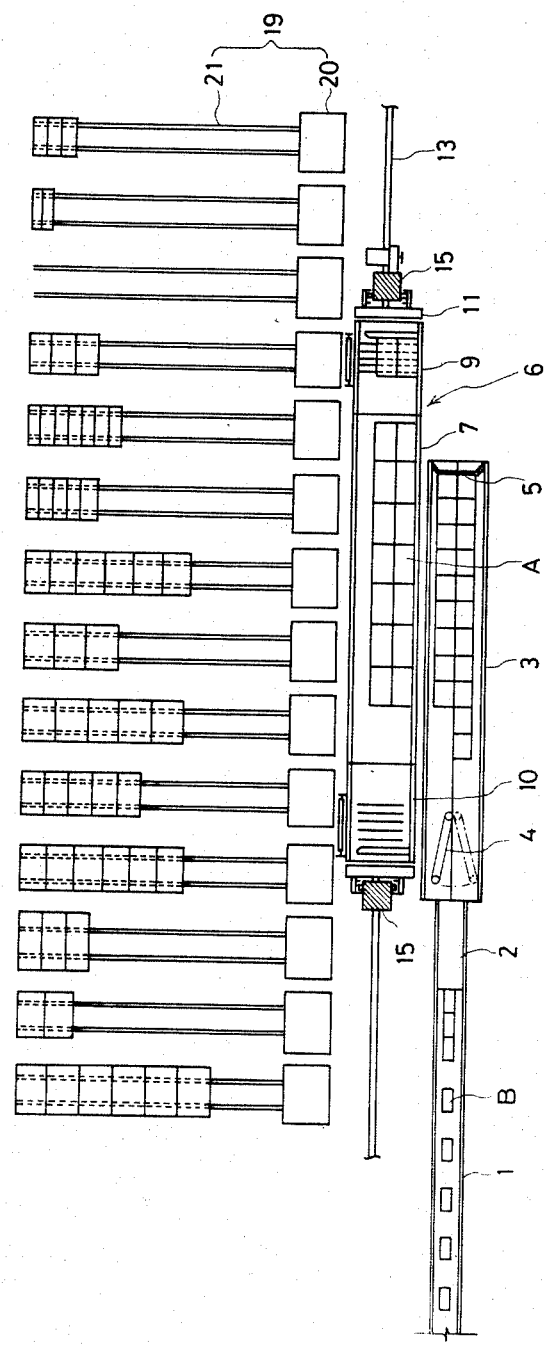
FIG. 1 is a plane view of the essential parts of one embodiment of the case feeder according to this invention.

In FIG. 1, a brake conveyor 2 is provided at an outlet terminal of a carrier conveyor 1, and an accumulation conveyor 3 in plural rows are installed adjacent to the brake conveyor 2. At an inlet terminal of this accumulation conveyor 3 is mounted a directional switch means 4 driven by belt and an end stopper 5 is provided at the other terminal. A feeding conveyor 6 is arranged in parallel and adjacent to the longitudinal direction of the accumulation conveyor 3. The feeding conveyor 6 is provided with a central conveyor 7 at the center and case feeding members 9 and 10 at both ends thereof.

Figure 2:
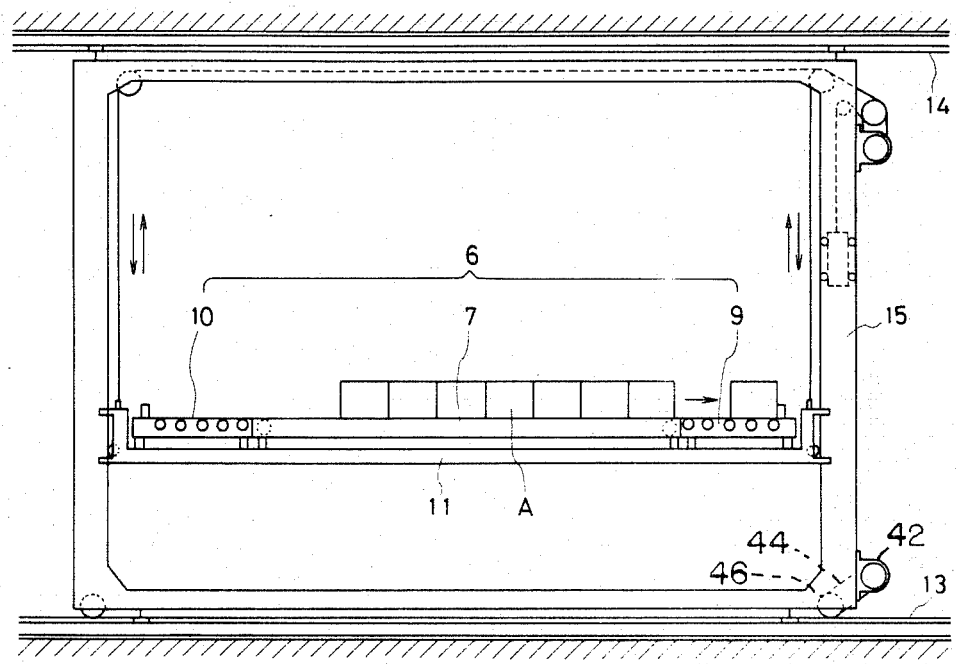
FIG. 2 is a frontal view thereof.
Figure 3:
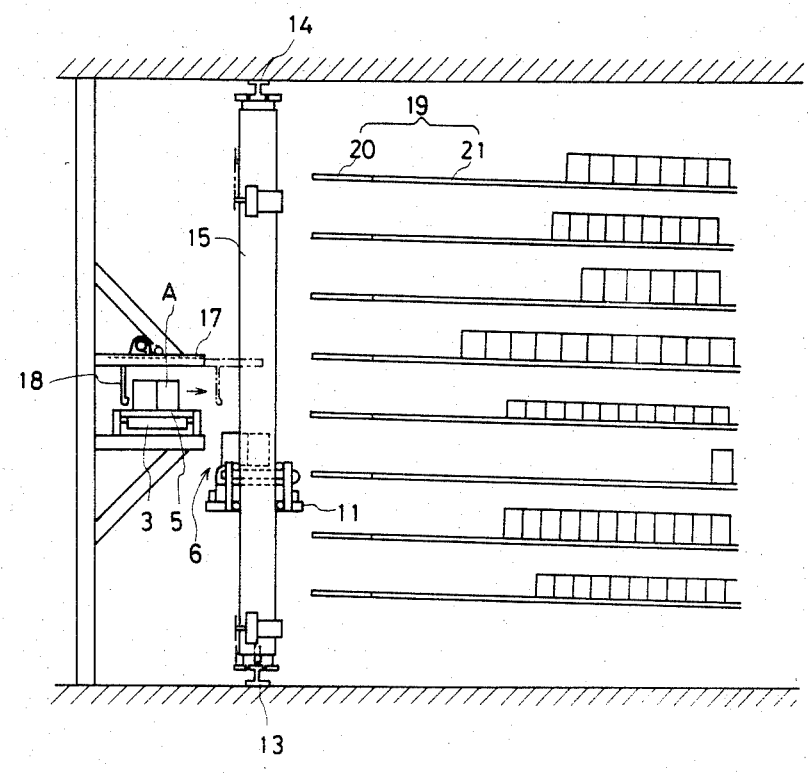
FIG. 3 is a side view thereof.

As shown in FIGS. 2 and 3, the feeding conveyor 6 is placed on an elevator frame 11. The elevator frame 11 is mounted in a vertically movable manner on a crane body frame 15 which travels along a pair of vertically spaced rails 13 and 14 which extend horizontally by means of a motor 42 connected as by a belt or sprocket chain 44 to a sprocket gear (not shown) on wheel 46. As indicated in FIG. 3, the accumulation conveyor 3, the conveyor 1 and the brake conveyor 2 are arranged midway between the distance between said rails 13 and 14 to form a station for transfer case members.

Above this accumulation conveyor 3 is provided a pusher 17 which collectively, i.e. simultaneously, transfers case members A stocked and aligned on the accumulation conveyor 3 onto the central conveyor 7. The length of a pusher bar 18 of the pusher 17 is substantially the same as the length of the accumulation conveyor 3 in the longitudinal direction (not shown) so that actuation of the pusher bar 18 will remove all cases on the conveyor 3 to conveyor 7. The distance which the pusher bar 18 travels is made to be identical at least or greater than the width of the accumulation conveyor 3. The surface of the accumulation conveyor 3 and the central conveyor 7 are formed smooth. The central conveyor 7 mounted at the center of the feeding conveyor 6 is constructed so as to be transportable in both horizontal directions.

Figure 4:
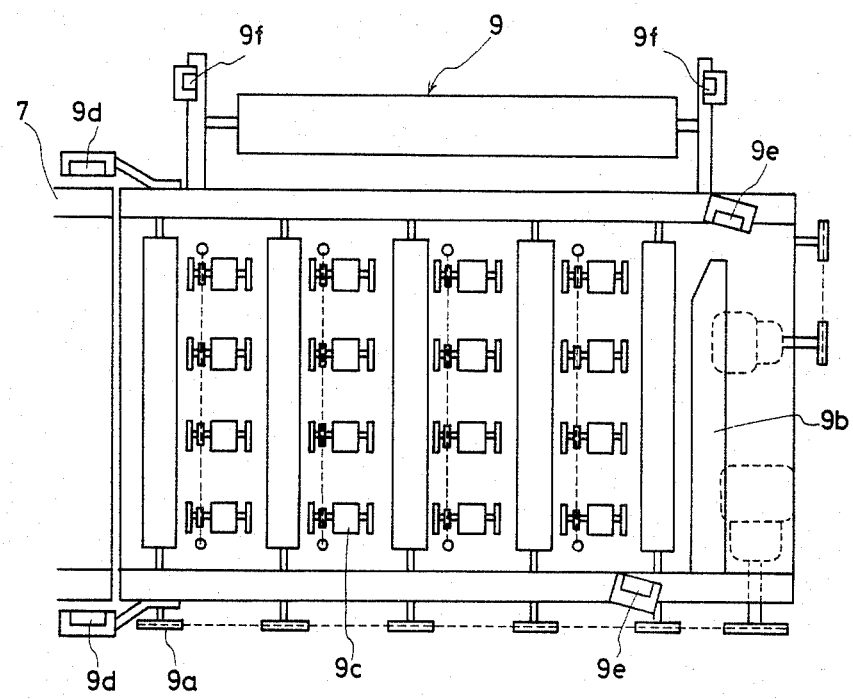
FIG. 4 is a plane view of the directional switch conveyor of the feeding conveyor of this invention.
Figure 5:
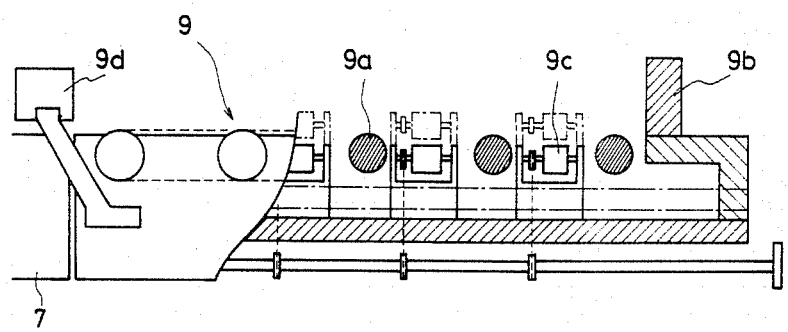
FIG. 5 is a frontal view thereof.

FIGS. 4 and 5 are the enlarged views of a case feeding member 9 (see FIG. 1) mounted at one end of the central conveyor 7. The case feeding member 9 is provided with quick feeding roll conveyors 9a, an end stopper 9b, conveyors for switching direction 9c, and photoelectric sensors 9d, 9e, and 9f which control the operation of both conveyors 9a and 9c. Conveyor 9c for switching direction of the cases is adapted to rise up between the rolls of the quick feeding roll conveyors 9a as shown in broken lines in FIG. 5, when a group of cases A abuts against the end stopper 9b to project above the upper faces of the rolls 9a and to guide the group of cases A in the direction perpendicular to the transport direction of the quick feeding roll conveyor 9a. The case feeding member 10 on the other end of the feeding conveyor 6 (see FIG. 1) is constructed in the manner similar to that of the case feeding member 9. Any suitable mechanism such as for example, a hydraulic piston and cylinder means connected to crank levers may be used to effect the raising and lowering of the conveyors 9c.

Returning back to FIG. 3, case flow racks 19 are arranged in multiple rows along said rails 13 and 14 and in multiple rows along said rails 13 and 14 and in multiple layers therebetween. The case flow racks 19 include a roll conveyor 20 and a wheel conveyor 21.

The operation of the case feeder constructed according to this embodiment is now explained. A group of cases A of the same type transported from the conveyor 1 is transferred to the accumulation conveyor 3 by way of the brake conveyor 2, guided by the directional switch 4 and stocked on the accumulation conveyor 3 for one row. The directional switch 4 is then shifted to the position shown by a broken line and the driving direction of the belt is also shifted in order to stock the subsequent row of a case group A. It is preferable to determine the length of the number of rows of the accumulation conveyor 3 so that one lot of cases A to be supplied to the case flow rack 19 may be stocked. This embodiment is contructed to have two rows in order to reduce the length of the feeding conveyor 6 and to increase the capacity sufficient to feed cases to the flow racks 19 by two cases at a time.

When a predetermined number of case groups A has been stocked in alignment and in a predetermined number on the accumulation conveyor 3 and the crane body frame 15 has reached the transfer station, the pusher bar 18 of the pusher 17 is moved forward to transfer one entire lot of cases A from the accumulation conveyor 3 onto the central conveyor 7 collectively.

When one lot of cases A has been transferred to the conveyor 7 and the pusher bar 18 has returned to the original position thereof, the crane body frame 15 and the elevator frame 11 move toward the desired roll conveyor 20 of the case flow rack 19 which is to be fed. The description below will explain the case where the central conveyor 7 feeds the cases A by two cases at a time onto the quick feeding roll conveyor 9a when both frames 11 and 15 have arrived at a desired position.

If the following formula holds:

$$V_1 < V_2 = V_3 \quad (1)$$

wherein: the transport speed of the central conveyor 7 is $V_1$, the transport speed of the quick feeding roll conveyor 9a is $V_2$, and the transport speed of the directional switch conveyor 9c is $V_3$, (for instance, $V_1 = 10$ m/min, $V_2 = V_3 = 10$ m/min) as the first two cases A is separated from the group of cases, the interval is detected by the photoelectric sensor 9d to suspend the central conveyor 7 temporarily.

When the two cases A abut against the end stopper 9b, the photoelectric sensor 9e is blocked from light. This makes the directional switch conveyor 9c rise to separate the cases A from the quick feeding roll conveyor 9a and to feed the same onto the roll conveyor 20 of the case flow rack 19. When the photoelectric sensor 9f confirms that the cases A has been transferred onto the roll conveyor 20, the directional switch conveyor 9c descends to wait until next case group A is fed from the quick feeding roll conveyor 9a.

The feeding conveyor 6 is constructed so that the portion on the right as viewed in FIG. 1 is allotted to the case feeding member 9 while the portion left thereto is allotted to the case feeding member 10. The central conveyor 7 which may be an endless belt moves to the right direction when it feeds cases A to the case feeding member 9 and to the left direction when it feeds cases A to the case feeding member 20. Due to this arrangement, if the length of the rails 13 and 14 is determined sufficiently to cover the width of all roll conveyors 20, cases A can be supplied to all the roll conveyors 20. If the central conveyor 7 is divided at the center into two conveyors, i.e. a conveyor for the right side and another conveyor for the left side, cases A will be fed in less time.

When a predetermined number of cases A has been supplied to the case flow rack 19 by repeating the above operation, the crane body frame 15 and the elevator frame 11 return to the case transfer station to receive cases from conveyor 3 by means of pusher 17.

The cases B of the following lot are piled on the accumulation conveyor 3 while the feeding conveyor 6 is feeding the cases A to the case flow rack 19. Subsequent lots of cases will be transported by repeating the above mentioned operation.

Figure 6:
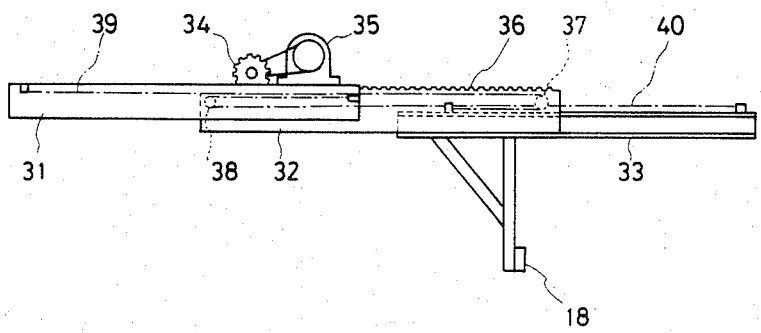
FIG. 6 is a side view of the essential part of another embodiment of a pusher thereof.

The pusher 17 shown in the above embodiment may be a pusher of a double stroke in case the space for the case feeder is limited, as shown in FIG. 6. The double stroke pusher comprises a first stage frame 31, a second stage frame 32 and a third stage frame 33, the above frames having a substantially identical length and being structured slidable to each other. A pinion 34 and a driving motor therefor are provided on the first stage frame 31 and a rack 36 is provided on the second stage frame 32 to engage with said pinion 34. The second stage frame 32 is internally provided with sprockets 37 and 38. The sprocket 37 is structured to be engaged with a chain 39 which is connected on one end thereof to the rear end of the first stage frame 31 and on the other end thereof to the rear end of the third stage frame 33. The sprocket 38, on the other hand, is structured to be engaged with a chain 40 which is connected on one end thereof to the front end of the first stage frame 31 and on the other end to the front end of the third stage frame 33.

As the revolution of the pinion 34 makes the second stage frame 32 advance, which in turn causes the chains 38 and 39 to push forward the second stage frame 32 and the third stage frame 33, the double stroke pusher of the above structure can extend the length of the stroke twice as long as before. The accumulation conveyor is not limited to the plural rows and may be of a single row in case the lot to be fed is small or the size of the cases is small.

The position of the case transfer station is not limited to the one indicated for the above embodiment but may be on the floor.

The directional switch conveyor may be replaced by a pusher.

As described in the foregoing, according to the present invention, the case feeder can transport lots of cases at a higher speed and a better efficiency as it is structured so that the cases which have been stocked on the accumulation conveyor are transferred to the feeding conveyor by lot and the cases of the subsequent lot can be stocked on the accumulation conveyor while the first lot of cases is being fed by the feeding conveyor.

In the feeding conveyor according to this invention, space can be fully utilized without leaving any deadspace because the feeding conveyor is arranged to be parallel to the accumulation conveyor in the longitudinal direction thereof and constructed to be movable in both directions along the longitudinal side thereof.

What is claimed is:

1. A case feeder of the type comprising an accumulation conveyor which is provided on one end of a carrier conveyor and which stocks a predetermined number of cases which are transported by said carrier conveyor, and a feeding conveyor which is mounted adjacent to said accumulation conveyor and which feeds the cases stocked on the accumulation conveyor to predetermined places respectively, the case feeder being characterized in that it is provided with a transfer means which collectively transfers the predetermined number of cases stocked on said accumulation conveyor to said feeding conveyor, and said feeding conveyor is parallel to said accumulation conveyor in the longitudinal direction thereof and is provided with a central conveyor at the center thereof which has means for transporting cases in both longitudinal directions and is provided with case feeding members on both ends thereof which are adjacent to the both ends of the central conveyor and which transport the cases from the end of the central conveyor to predetermined places.

2. The case feeder as claimed in claim 1 wherein the conveying direction of the accumulation conveyor is parallel to the conveying direction of the central conveyor while the transferring direction of the transfer means is perpendicular to said conveying direction of said accumulation conveyor.

3. The case feeder as claimed in claim 1 or claim 2 wherein the conveying direction of case feeding members is perpendicular to the conveying direction of the central conveyor.

4. The case feeder as claimed in claim 3 wherein the transfer means is a pusher.

5. The case feeder as claimed in claim 4 wherein the feeding conveyor is constructed in a manner to allow free movement thereof in the longitudinal direction thereof.

6. The case feeder as claimed in claim 3 wherein the feeding conveyor is constructed in a manner to allow free movement thereof in the longitudinal direction thereof.

7. The case feeder as claimed in claim 1 wherein the transfer means is a pusher.

8. The case feeder as claimed in claim 2 wherein the transfer means is a pusher.

9. The case feeder as claimed in claim 1 wherein the feeding conveyor is constructed in a manner to allow free movement thereof in the longitudinal direction thereof.

10. The case feeder as claimed in claim 2 wherein the feeding conveyor is constructed in a manner to allow free movement thereof in the longitudinal direction thereof.

* * * * *